US007278526B2

United States Patent
(12) United States Patent
Vermeersch et al.

(10) Patent No.: US 7,278,526 B2
(45) Date of Patent: Oct. 9, 2007

(54) INTEGRATED POSITION SWITCH/BRAKE TRANSMISSION SHIFT INTERLOCK FOR ELECTRONIC GEAR INDICATION

(75) Inventors: Michael C. Vermeersch, Saginaw, MI (US); Larry W. Burr, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 11/112,037

(22) Filed: Apr. 22, 2005

(65) Prior Publication Data

US 2005/0236252 A1 Oct. 27, 2005

Related U.S. Application Data

(60) Provisional application No. 60/564,865, filed on Apr. 23, 2004.

(51) Int. Cl.
*B60K 20/06* (2006.01)

(52) U.S. Cl. .................................. 192/220.2; 74/483 R

(58) Field of Classification Search ............. 192/220.2, 192/220.4; 74/473.23, 473.31; 340/456
See application file for complete search history.

(56) References Cited

U.S. PATENT DOCUMENTS

| | | | | |
|---|---|---|---|---|
| 3,942,614 | A | | 3/1976 | Thompson |
| 4,051,915 | A | | 10/1977 | Behrens |
| 4,187,935 | A | | 2/1980 | Ohern |
| 4,380,752 | A | * | 4/1983 | Reynolds .................... 340/457 |
| 4,887,702 | A | | 12/1989 | Ratke et al. |
| 4,905,802 | A | | 3/1990 | Gotoh |
| 4,917,224 | A | | 4/1990 | Gokee |
| 4,919,242 | A | | 4/1990 | Muramatsu et al. |
| 4,932,493 | A | | 6/1990 | Sakurai et al. |
| 4,966,262 | A | | 10/1990 | Mieczkowski |
| 4,981,048 | A | * | 1/1991 | Kobayashi et al. ....... 74/483 R |
| 4,986,399 | A | | 1/1991 | Gokee |
| 5,014,831 | A | | 5/1991 | Wawra et al. |
| 5,022,504 | A | | 6/1991 | Kobayashi |
| 5,027,931 | A | | 7/1991 | Ratke et al. |
| 5,031,736 | A | | 7/1991 | Kobayashi et al. |
| 5,042,317 | A | | 8/1991 | Malara |
| 5,078,242 | A | | 1/1992 | Ratke et al. |
| 5,161,657 | A | | 11/1992 | Papenhagen et al. |
| 5,167,308 | A | | 12/1992 | Osborn |
| 5,275,065 | A | | 1/1994 | Ruiter |
| 5,309,744 | A | | 5/1994 | Kito et al. |
| 5,314,049 | A | | 5/1994 | Nordstrom |
| 5,402,870 | A | | 4/1995 | Osborn |
| 5,489,246 | A | | 2/1996 | Moody et al. |

(Continued)

*Primary Examiner*—Richard M Lorence
(74) *Attorney, Agent, or Firm*—Michael D. Smith

(57) ABSTRACT

The invention provides a brake-transmission interlock system for a vehicle. The brake-transmission interlock system prevents the driver from shifting out of a park transmission position with a selector lever unless at least one brake of the vehicle is engaged. The brake-transmission interlock system includes a locking member operable to move to a locked position wherein movement of the selector lever is prevented. The locking member can move to the locked position from an unlocked position wherein the selector lever is moveable to shift out of the park transmission position. The brake-transmission interlock system also includes an indicating device operable to communicate a signal corresponding to the park transmission position to the driver. The locking member is in the locked position prior to the signal being communicated.

10 Claims, 2 Drawing Sheets

P R N D L2 L1
10 14 16 18 20 22 24 26 28 30 32 34 36 38 40 42 44 46 48 50 52 54 56 88

U.S. PATENT DOCUMENTS

| | | | | |
|---|---|---|---|---|
| 5,562,568 | A | 10/1996 | Smale | |
| 5,566,583 | A | 10/1996 | Suzuki | |
| 5,647,464 | A | 7/1997 | Snell et al. | |
| 5,755,313 | A | 5/1998 | Kim | |
| 5,853,348 | A | 12/1998 | Lehman | |
| 5,924,540 | A | 7/1999 | Kim | |
| 6,161,672 | A | 12/2000 | Maida et al. | |
| 6,308,814 | B1 | 10/2001 | Ikegami | |
| 6,476,713 | B2 * | 11/2002 | Morimoto | 340/456 |
| 6,554,738 | B1 | 4/2003 | Bek | |
| 6,592,492 | B1 | 7/2003 | Kalia | |
| 6,848,559 | B2 | 2/2005 | Kim | |
| 7,137,499 | B2 * | 11/2006 | Riefe et al. | 192/220.2 |
| 2003/0213673 | A1 * | 11/2003 | Burr et al. | 192/220.2 |

* cited by examiner

INTEGRATED POSITION SWITCH/BRAKE TRANSMISSION SHIFT INTERLOCK FOR ELECTRONIC GEAR INDICATION

CROSS REFERENCE TO RELATED APPLICATIONS

This application claims the benefit of U.S. Provisional Patent Application Ser. No. 60/564,865 for an INTEGRATED POSITION SWITCH/BRAKE TRAMSISSION SHIFT INTERLOCK FOR ELECTRONIC GEAR INDICATION, filed on Apr. 23, 2004, which is hereby incorporated by reference in its entirety.

FIELD OF THE INVENTION

The invention relates to a brake-transmission interlock system for a vehicle.

BACKGROUND OF THE INVENTION

A brake-transmission interlock system brings the vehicle transmission and the vehicle braking system into cooperation with one another through a locking device. When a driver attempts to shift the vehicle transmission from park to some other gear arrangement, the brake-transmission interlock system prevents shifting unless at least one of the vehicle brakes is engaged. Some form of locking device engages the shifting mechanism to lock the shifting mechanism if at least one of the vehicle brakes is not engaged. If at least one of the vehicle brakes is engaged, the brake-transmission interlock system controls the locking device to unlock the shifting mechanism and allow the driver to shift the vehicle transmission from park to some other gear arrangement.

SUMMARY OF THE INVENTION AND ADVANTAGES

The invention provides a brake-transmission interlock system for a vehicle. The brake-transmission interlock system prevents the driver from shifting out of a park transmission position with a selector lever unless at least one brake of the vehicle is engaged. The brake-transmission interlock system includes a locking member operable to move to a locked position wherein movement of the selector lever is prevented. The locking member can move to the locked position from an unlocked position wherein the selector lever is moveable to shift out of the park transmission position. The brake-transmission interlock system also includes an indicating device operable to communicate a signal corresponding to the park transmission position to the driver. The locking member is in the locked position prior to the signal being communicated.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
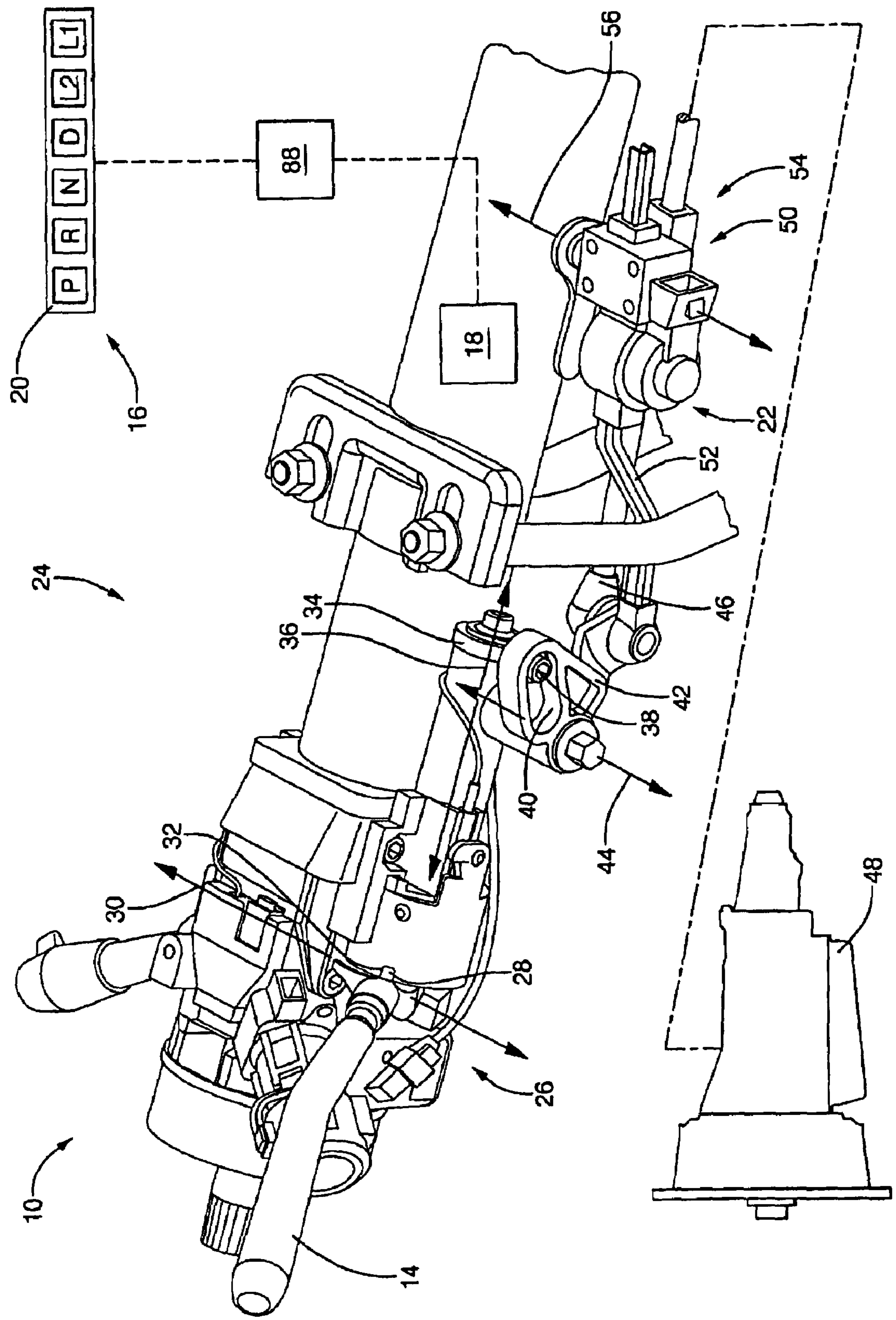
FIG. 1 is a schematic perspective view of a brake-transmission interlock system according to the exemplary embodiment of the invention.

An exemplary operating environment for a brake-transmission interlock system 10 according to one embodiment of the invention is shown in FIG. 1. A steering column 24 is mountable in a vehicle and supports a transmission shift mechanism 26. The transmission shift mechanism 26 includes a selector lever 14 engageable by a driver of the vehicle. The lever 14 is fixedly associated with a tooth 28. Pivoting of the lever 14 about an axis 30 draws the tooth 28 out of, or directs the tooth 28 into, one of a plurality of detents fixedly supported by the steering column 24, such as park detent 32. When the tooth 28 is disposed in the detent 32 the vehicle is in park. The steering column 24 can also support other detents for drive, neutral, reverse, low-one and low-two, for example. After the lever 14 has pivoted about the axis 30 to draw the tooth 28 from the detent 32, the lever 14 and axis 30 can be rotated about an axis 36 extending parallel to the steering column 24 to direct the tooth 28 into another detent.

The transmission shift mechanism 26 also includes a ring member 34 operable to rotate about the axis 36 with the lever 14. A projection 38 extends from the ring member 34 into a slot 40 defined by a linking member 42. The linking member 42 is also part of the transmission shift mechanism 26 and is mounted for rotation about an axis 44. The projection 38 and slot 40 cooperate in cam—cam follower relationship such that the linking member 42 rotates about the axis 44 in response to rotation of the ring member 34 about the axis 36. The transmission shift mechanism 26 also includes a rod 46 pivotally connected to the linking member 42 at one end and operatively connected to a transmission 48 of the vehicle at the other end. The rod 46 moves in response to rotation of the linking member 42. A gear arrangement of the transmission 48, such as neutral, reverse, park, drive, changes in response to movement of the rod 46.

A locking device 50 is included in the exemplary embodiment of the invention to lock the transmission shift mechanism 26. The locking device 50 includes a rod 52 and locking mechanism 54. At one end, the rod 52 is pivotally mounted with the linking member 42 adjacent the rod 46. The rod 52 extends from the one end and is slidably received in the locking mechanism 54. The locking mechanism 54 is mounted to the steering column 24 for pivoting movement about an axis 56. When the locking device 50 is unlocked, the locking mechanism 54 pivots about the axis 56 in response to pivoting movement of the linking member 42 about the axis 44. Also, when the locking device 50 is unlocked, the rod 52 slides relative to the locking mechanism 54 in response to pivoting movement of the linking member 42 about the axis 44.

Figure 2:
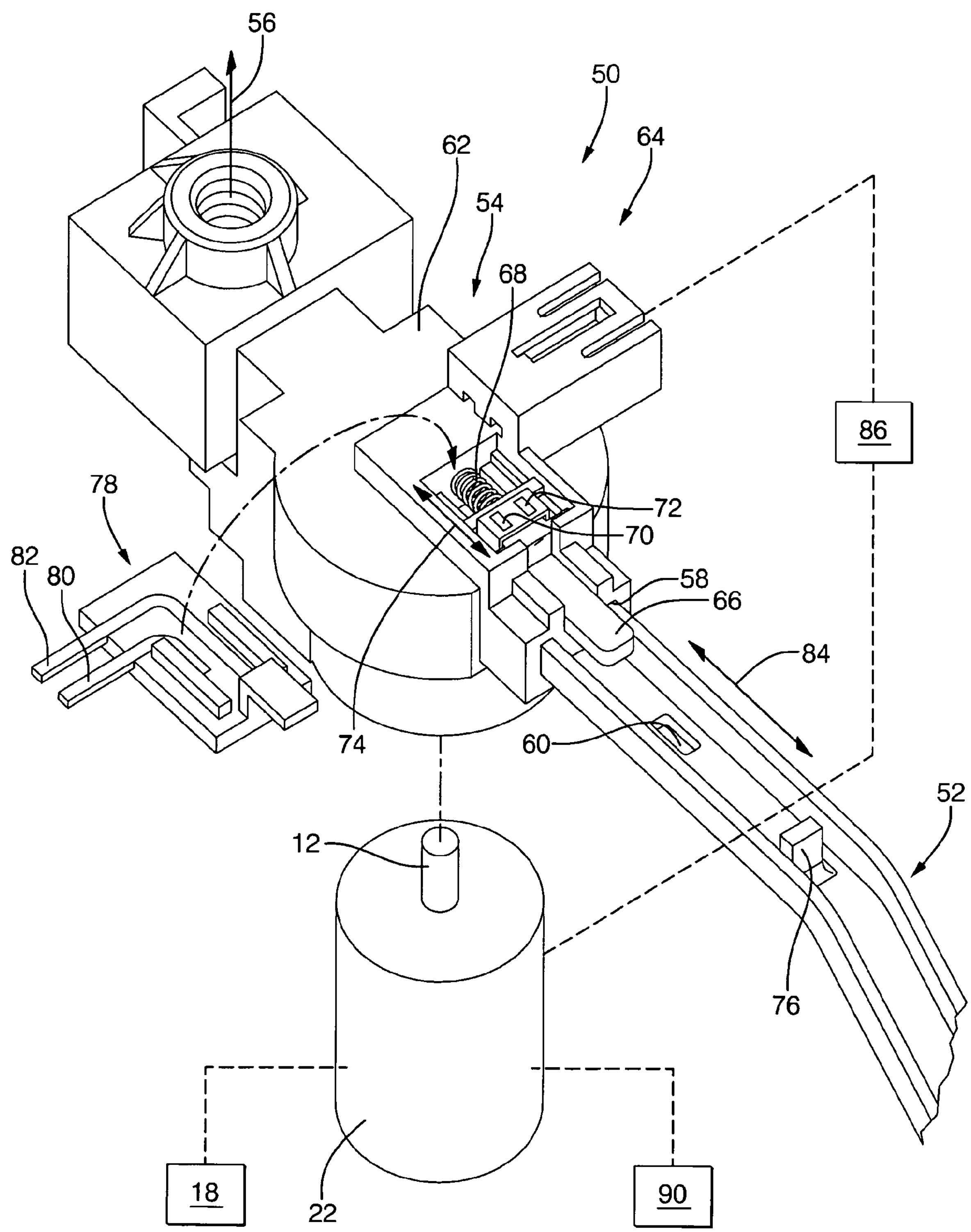
FIG. 2 is a schematic exploded view of a locking device for locking a transmission shift mechanism.

As best shown in FIG. 2, the rod 52 is received in a complementary-shaped aperture or slot 58 defined by the locking mechanism 54. The rod 52 also includes an aperture 60 extending transverse to a longitudinal axis of the rod 52 and a projection 76 extending transverse to the longitudinal axis of the rod 52. The purposes of the aperture 60 and the rod 52 in the exemplary embodiment of the invention will be described in greater detail below.

The locking mechanism 54 includes a housing 62, a solenoid actuator 22 fixedly engaged with the housing 62, a locking member 12 moveable between locked and unlocked positions by the solenoid 22, and a switch assembly 64 for selectively energizing the solenoid 22. The housing 62 can be molded plastic. The switch assembly 64 includes a moveable plunger 66 biased outwardly from the housing 62 with a biasing device 68. A pair of electrical contacts 70, 72 are supported by the plunger 66 for movement with the plunger 66 along a path 74. The switch assembly 64 also includes a cap 78 supporting leads 80, 82. The contacts 70, 72 are spaced from the leads 80, 82, respectively, when the plunger 66 is biased fully outwardly by the biasing device 68. As will be described in greater detail below, the contacts 70, 72 and leads 80, 82 are part of an electric circuit for energizing the solenoid 22.

The rod 52 moves along a path 84 relative to the housing 62 in response to pivoting movement of the linking member 42. The projection 76 moves along the path 84 and engages the plunger 66. The plunger 66 is urged against the biasing device 68 by the projection 76 and the biasing device 68 is compressed. The projection 76 pushes the plunger 66 along the path 74 to bring the contacts 70, 72 into contact with the leads 80, 82, respectively. When the contacts 70, 72 engage the leads 80, 82, the circuit including the solenoid 22 and a power source 86 is closed and the solenoid 22 is energized.

The locking member 12 and the solenoid 22 cooperate such that when the solenoid 22 is not energized the locking member 12 is disposed in the aperture 60, in the locked position. As a result, the rod 52 is immovably associated with the locking mechanism 54 and the transmission shift mechanism 26 is locked. When the solenoid 22 is energized, the locking member 12 is moved out of the aperture 60, to the unlocked position. As a result, the rod 52 is slidably associated with the locking mechanism 54 and the transmission shift mechanism 26 is unlocked.

In another aspect of the exemplary operating environment, a brake sensing system 90 cooperates with the solenoid 22. The brake sensing system 90 senses if at least one brake of the vehicle is engaged and, if so, energizes the solenoid 22 to move the locking member 12 out of the aperture 60. The brake sensing system 90 can be associated with the brake pedal or with one of the brakes disposed at the wheels.

In some prior known operating environments, a tooth similar to tooth 28 may not be suitably aligned with a detent such as detent 32 to fully move into the detent. Even though the tooth is not fully in the detent, the structure disposed in the vehicle for advising the driver of the transmission gear arrangement may still indicate to the driver that the vehicle is in park. This condition is known as an incomplete shift. Furthermore, in prior operating environments, the lock for locking the transmission shift mechanism is not responsive to the same structure in the vehicle that advises the driver the vehicle is in park. In other words, the lock of the brake-transmission interlock system may not engage even though the driver is advised that the vehicle is in park. The exemplary embodiment of the invention addresses this problem, heretofore unappreciated, in prior operating environments.

The invention provides a brake-transmission interlock system 10 for a vehicle. The brake-transmission interlock system 10 prevents the driver from shifting out of a park transmission position with the selector lever 14 unless at least one brake of the vehicle is engaged. The brake-transmission interlock system 10 includes the locking member 12 operable to move to a locked position wherein movement of the selector lever 14 is prevented. The locking member can move to the locked position from an unlocked position wherein the selector lever 14 is moveable to shift out of the park transmission position. The brake-transmission interlock system 10 also includes an indicating device 16 operable to communicate a signal corresponding to the park transmission position to the driver. The locking member 12 is in the locked position prior to the signal being communicated. In the exemplary embodiment of the invention, the indicating device 16 communicates the signal only after the locking member 12 is in the locked position. As a result, the driver is advised that the vehicle is in park only after the locking device 50 of the brake-transmission interlock system 10 has been engaged.

The indicating device 16 of the exemplary embodiment includes a light 20 operable to selectively illuminate. The light 20 is disposed in the passenger compartment of the vehicle and can be disposed on the dashboard. The indicating device 16 of the exemplary embodiment also includes a controller 88. A sensor 18 is disposed to sense when the locking member 12 is in the locked position. The sensor 18 can be a proximity sensor sensing proximity of the locking member 12, or can be a voltage/current sensor sensing an electric current in the solenoid 22, or can be any other type of sensor operable to detect the locking member 12 in the locked position. The sensor 18 communicates a second signal to the controller 88 of the indicating device 16 corresponding to the locking member 12 being in the locked position and in response the controller 88 controls the light 20 to illuminate.

Alternative embodiments of the invention can be practiced in other operating environments. For example, the invention can be practiced wherein the transmission gear arrangement is controlled electronically rather than mechanically as shown in the exemplary embodiment. Also, the indicating device can be a mechanical device such as an arrow or pin rather than an electrical device such as a light. Also, the invention can be practiced with any type of locking device known in the art.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brake-transmission interlock system of a vehicle wherein shifting out of a park transmission position by a driver with a selector lever is prevented unless at least one brake of the vehicle is engaged, the brake-transmission interlock system comprising:

a locking member operable to move to a locked position wherein movement of the selector lever out of the park transmission position and into an unlocked position for shift movement is prevented; and an indicating device operable to communicate a signal corresponding to the park transmission position to the driver wherein said locking member being in said locked position prior to said signal being communicated.

2. The brake-transmission interlock system of claim 1 further comprising a sensor disposed to sense when said locking member is in said locked position and communicate a second signal to said indicating device corresponding to said locking member being in said locked position.

3. The brake-transmission interlock system of claim 2 wherein said indicating device includes a light operable to selectively illuminate.

4. The brake-transmission interlock system of claim 3 further comprising:

a solenoid operable in an energized condition to move said locking member to said unlocked position and in a de-energized condition to move said locking member to said locked position.

5. The brake-transmission interlock system of claim 4 wherein said sensor is further defined as being operable to sense an electric current in said solenoid.

6. A method for engaging a brake-transmission interlock system of a vehicle wherein shifting out of a park transmission position by a driver with a selector lever is prevented unless at least one brake of the vehicle is engaged, the method comprising the steps of:

moving a locking member to a locked position wherein movement of the selector lever is prevented from an unlocked position wherein the selector lever is moveable to shift out of the park transmission position; and communicating a signal corresponding to the park transmission position to the driver with an indicating device after said moving step such that the locking member is moved to the locked position prior to the signal being communicated.

7. A brake-transmission interlock system of a vehicle wherein shifting out of a park transmission position by a driver with a selector lever is prevented unless at least one brake of the vehicle is engaged, the brake-transmission interlock system comprising:

a solenoid having a locking member constructed and arranged to move between an unlocked position and a locked position, wherein movement of the selector lever out of the park transmission position is prevented when the locking member is in the locked position; and an indicating device having a sensor constructed and arranged to detect the locked position of the locking member and communicate an electric signal corresponding to the park transmission position to a controller of the indicating device.

8. The brake-transmission interlock system set forth in claim 7 wherein the sensor is a proximity sensor for directly detecting the proximity of the locking member.

9. The brake-transmission interlock system set forth in claim 7 wherein the sensor is a voltage/current sensor for detecting electric voltage/current of the solenoid.

10. The brake-transmission interlock system set forth in claim 7 wherein the controller controls a light of the indicating device.

* * * * *